(12) United States Patent
Margolin et al.

(10) Patent No.: US 7,806,599 B2
(45) Date of Patent: Oct. 5, 2010

(54) SUPER MINIATURE, SINGLE FIBER OPTICAL INTERCONNECT SYSTEM WITH PARALLEL SLIDER PUSH-PUSH TYPE INSERTION/WITHDRAWAL MECHANISM AND METHOD FOR USING SAME

(75) Inventors: Mark Margolin, Highland Park, IL (US); Gregory Bunin, Lake Zurich, IL (US)

(73) Assignee: Illum Technologies, Inc., Northbrook, IL (US)

( * ) Notice: Subject to any disclaimer, the term of this patent is extended or adjusted under 35 U.S.C. 154(b) by 43 days.

(21) Appl. No.: 11/744,610

(22) Filed: May 4, 2007

(65) Prior Publication Data

US 2008/0273837 A1    Nov. 6, 2008

(51) Int. Cl.
   *G02B 6/36*    (2006.01)
(52) U.S. Cl. .......................................... 385/75; 385/77
(58) Field of Classification Search .............. 385/75, 385/77
   See application file for complete search history.

(56) References Cited

U.S. PATENT DOCUMENTS

| | | | |
|---|---|---|---|
| 4,026,624 A | 5/1977 | Boag | |
| 4,726,647 A | 2/1988 | Kakii et al. | |
| 4,900,263 A | 2/1990 | Manassero et al. | |
| 5,004,431 A | 4/1991 | Previato et al. | |
| 5,082,344 A | 1/1992 | Mulholland et al. | |
| 5,214,730 A | 5/1993 | Nagasawa et al. | |
| 5,317,663 A | 5/1994 | Beard et al. | |
| 5,418,875 A | 5/1995 | Nakano et al. | |
| 5,588,079 A | 12/1996 | Tanabe et al. | |
| 5,838,856 A | 11/1998 | Lee | |
| 5,926,596 A | 7/1999 | Edwards et al. | |
| 6,076,973 A | 6/2000 | Lu | |
| 6,200,040 B1 | 3/2001 | Edwards et al. | |
| 6,238,278 B1 | 5/2001 | Haftmann | |
| 6,247,850 B1 | 6/2001 | Edwards et al. | |
| 6,290,527 B1 | 9/2001 | Takaya et al. | |
| 6,334,715 B1 * | 1/2002 | So et al. | 385/60 |
| 6,409,393 B1 | 6/2002 | Grois et al. | |
| 6,422,759 B1 | 7/2002 | Kevern | |
| 6,457,878 B2 | 10/2002 | Edwards et al. | |

(Continued)

OTHER PUBLICATIONS

Research at Photonics Laboratories (4-5): MU-type Angled-PC Connector, Copyright 2004 Nippon Telegraph and Telephone Corporation, 1 page.

(Continued)

*Primary Examiner*—Jerry T Rahll
(74) *Attorney, Agent, or Firm*—Patzik, Frank & Samotny Ltd.

(57) ABSTRACT

An optical fiber interconnect system wherein the adapter employs a push-push interconnect mechanism wherein the adapter employs a spring loaded slider that moves in a single plane in response to a first pushing force to engage the connector with the adapter and a second pushing force to disengage the connector from the adapter so that the connector can be withdrawn from the adapter.

The adapter includes an automatic shutter that is opened upon contact by the inserted connector housing with a cam on the lower portion of the shutter, but avoids contact with the ferrule polished end face. Angled latches are provided on the modular contact so as to enable disengagement and removal of the contact from the remainder of the connector assembly from the front thereof.

9 Claims, 16 Drawing Sheets

U.S. PATENT DOCUMENTS

| | | | |
|---|---|---|---|
| 6,505,976 | B1 | 1/2003 | Grois et al. |
| D476,624 | S | 7/2003 | Watanabe et al. |
| 6,634,796 | B2 | 10/2003 | de Jong et al. |
| 6,695,489 | B2 | 2/2004 | Nault |
| 6,702,479 | B2 | 3/2004 | Yang |
| 6,814,499 | B2 | 11/2004 | Finona |
| 6,823,109 | B2 | 11/2004 | Sasaki et al. |
| 6,886,990 | B2 | 5/2005 | Taira et al. |
| 6,918,704 | B2 | 7/2005 | Marrs et al. |
| 7,008,117 | B2 | 3/2006 | Kiani et al. |
| 7,182,524 | B2 | 2/2007 | Kramer et al. |
| 7,198,410 | B2 | 4/2007 | Kerry et al. |
| 7,234,875 | B2 | 6/2007 | Krowiak et al. |
| 7,261,472 | B2 | 8/2007 | Suzuki et al. |
| 7,284,912 | B2 | 10/2007 | Suzuki et al. |
| 2006/0153504 | A1 | 7/2006 | Suzuki et al. |
| 2006/0280408 | A1 | 12/2006 | Anderson et al. |

OTHER PUBLICATIONS

HMU Series: MU Type Fiber Optics Connectors, 20 pages.

Korean Intellectual Property Office, International Search Report, Oct. 24, 2008, for corresponding International Application No. PCT/US2008/062440.

Furukawa Electric Co., Ltd., Japanese Patent Abstract, Publication No. JP-2006-323067, Published Nov. 30, 2006.

Hirose Electric Co., Ltd., Japanese Patent Abstract, Publication No. JP-2002-341187, Published Nov. 27, 2002.

* cited by examiner

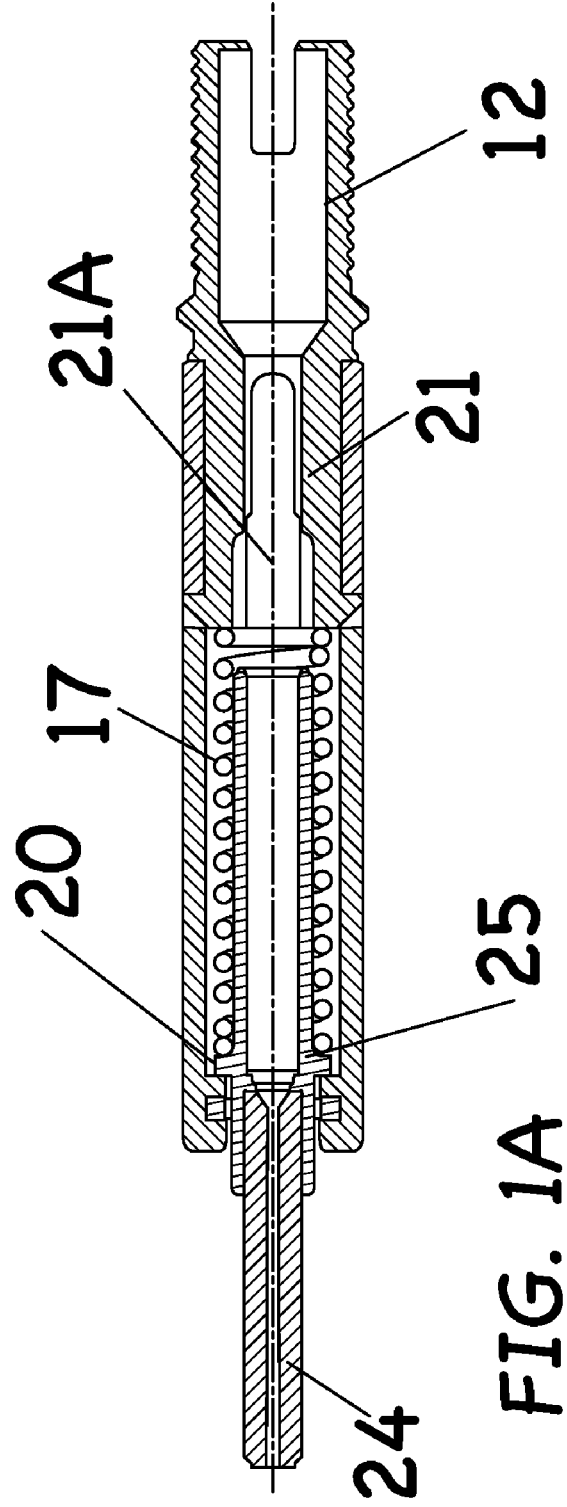
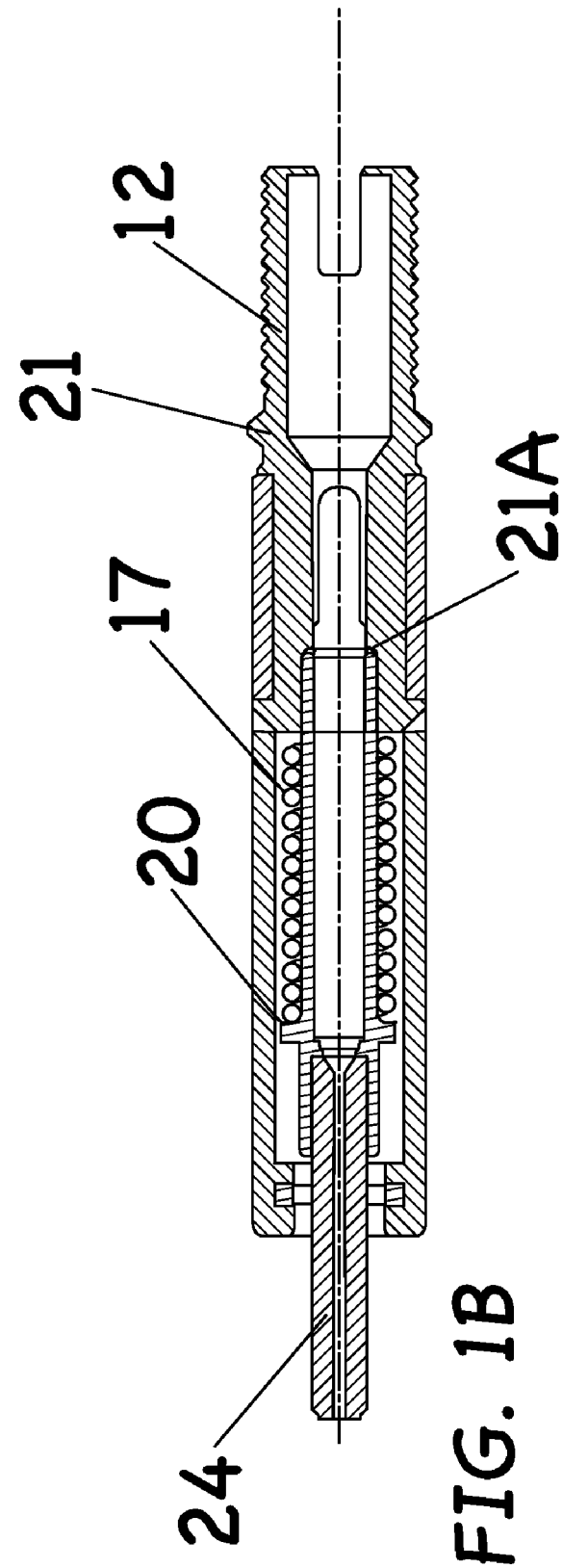
FIG. 1A
FIG. 1B

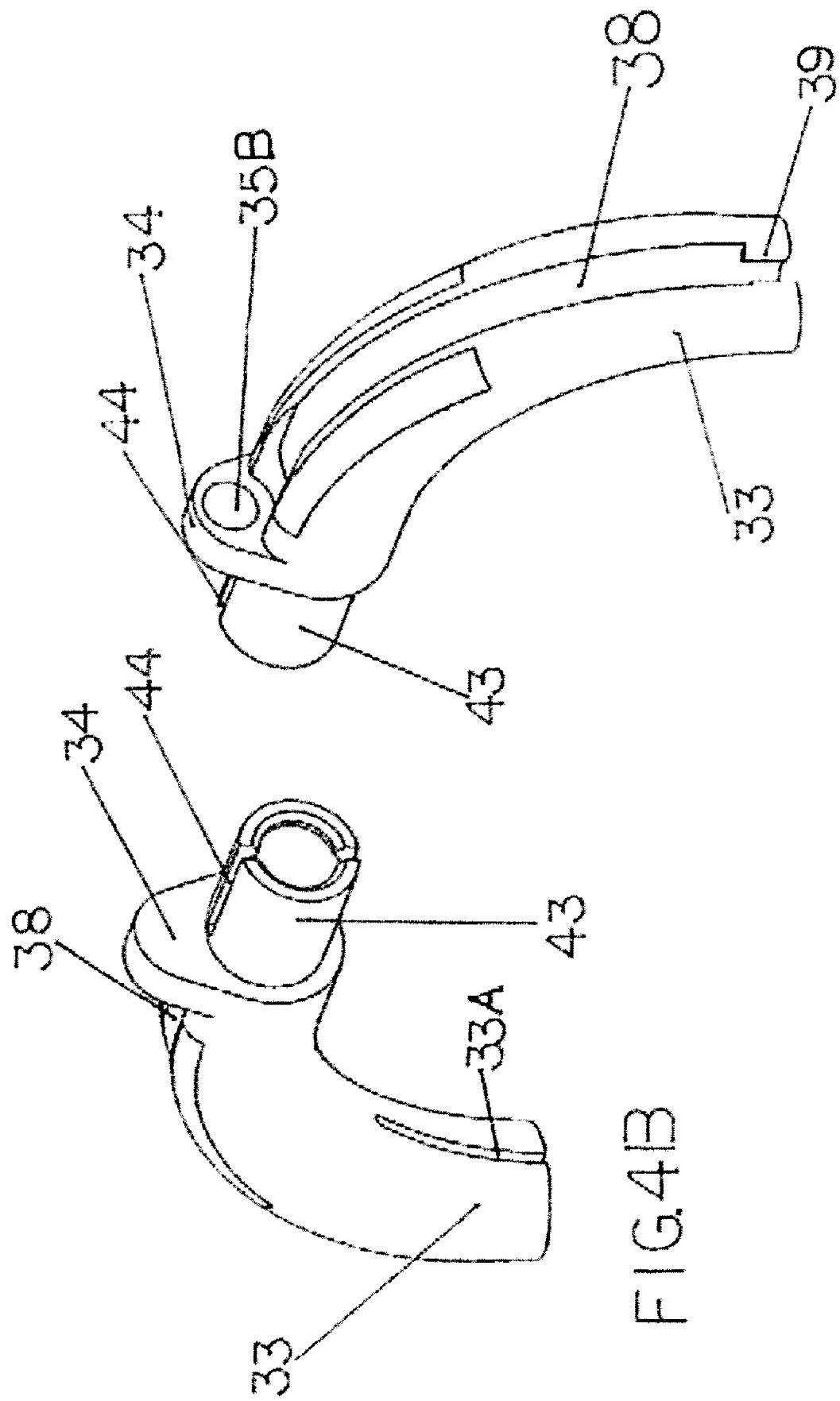

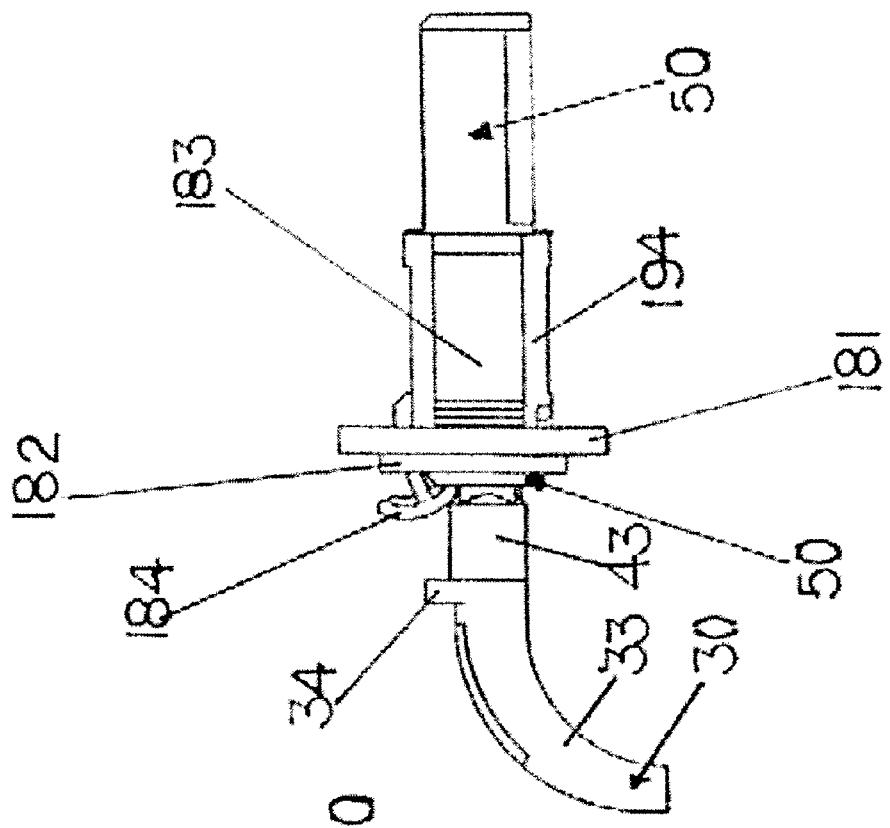
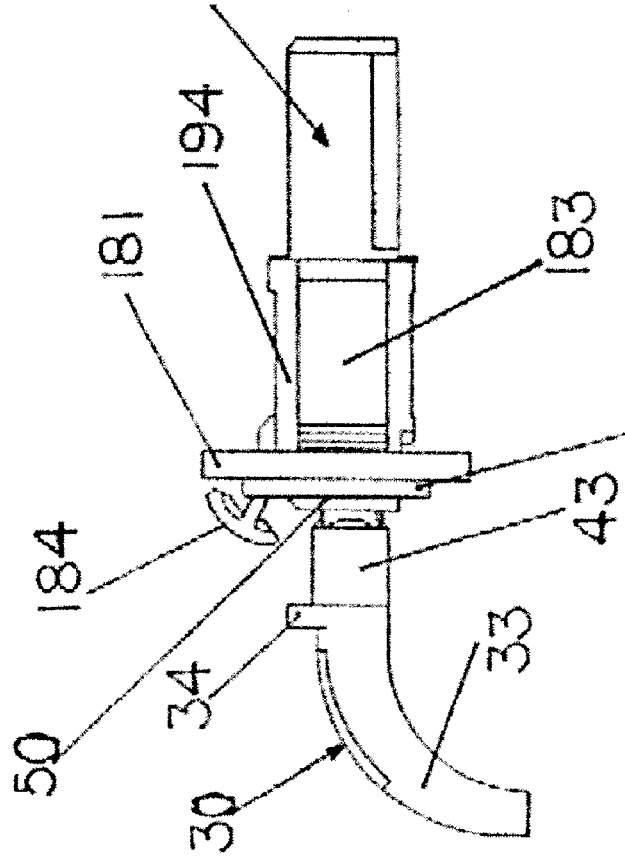
FIG. 8C
FIG. 8B

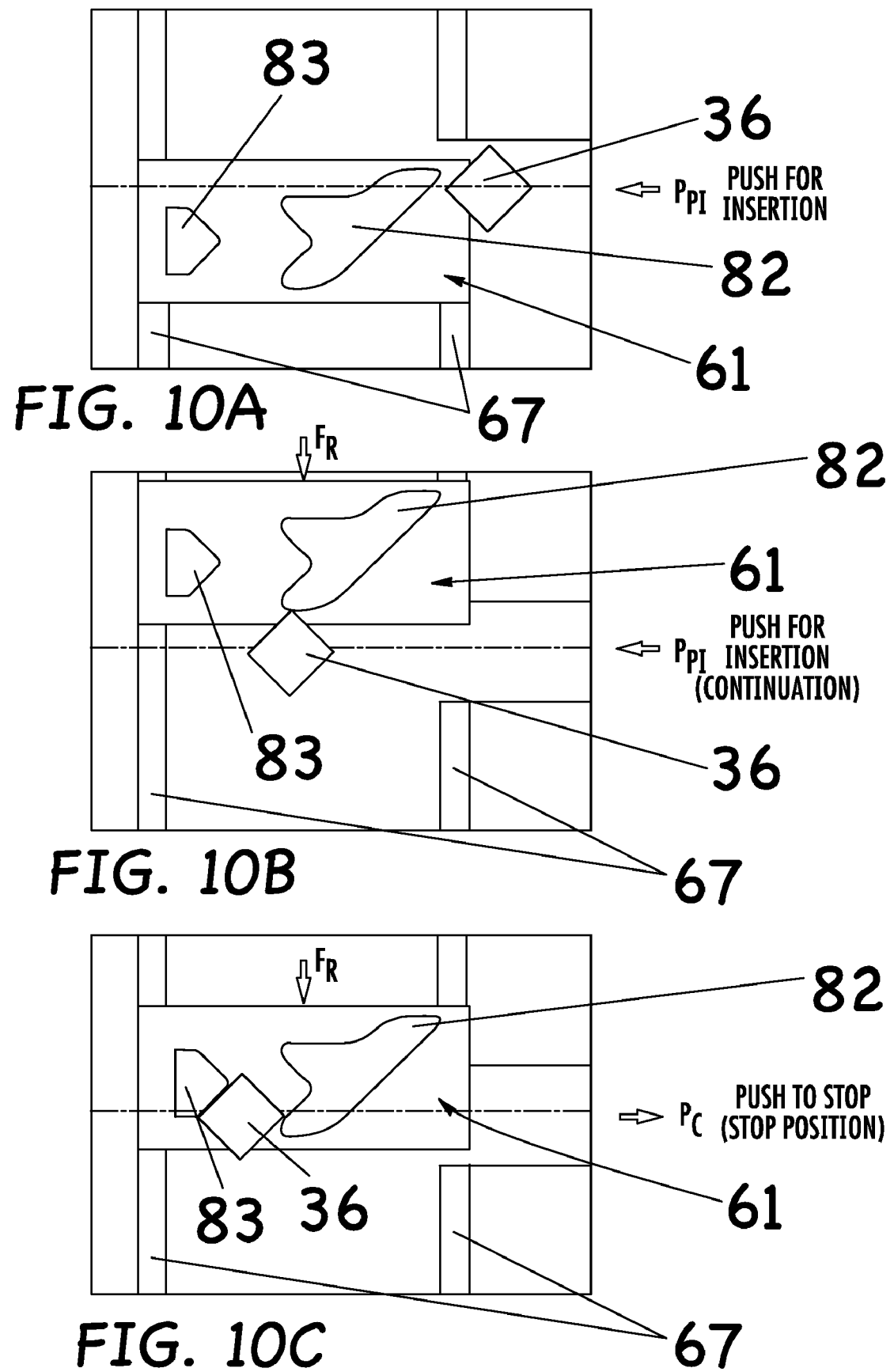

SUPER MINIATURE, SINGLE FIBER OPTICAL INTERCONNECT SYSTEM WITH PARALLEL SLIDER PUSH-PUSH TYPE INSERTION/WITHDRAWAL MECHANISM AND METHOD FOR USING SAME

FIELD OF INVENTION

This invention relates to fiber optics interconnect systems and, more particularly, to a super miniature form factor, low-loss single fiber optic interconnect system consisting of fiber optic connectors and corresponding adapters for the precise end-to-end mating of fiber optic cables. More particularly, the invention further relates to an interconnect system including fiber optic connectors comprising universal modular contacts and corresponding adapters with parallel slider type push-push insertion/withdrawal mechanisms and the methods for using same.

BACKGROUND OF THE INVENTION

Generally, modern single fiber optical connector plugs are manufactured with ferrule diameters ranging from 1.25 to 2.5 millimeters. The present invention enables the use of sub-millimeter ferrules in super miniature, single fiber ("simplex") optical connectors and adapters that allow very high density configurations.

One example of a "push-push" type single fiber optical interconnect system is shown in Suzuki et al., Pub. No. US 2006/0153503, Pub. Date Jul. 13, 2006; application Ser. No. 11/155,360 filed Jun. 17, 2005 (the "'360 application"). The present invention provides significant improvements over the system of the '360 application.

SUMMARY OF THE INVENTION

One object of the present invention is to provide a miniature footprint, single fiber optical interconnect system better suited for high density applications and which has a parallel slider push-push engagement/disengagement system for quick and convenient operation in an environment where it is difficult to reach and activate a conventional fiber optical interconnect system.

The preferred embodiment of the present invention comprises an optical fiber interconnect system wherein a connector is provided for carrying an optical fiber along a longitudinal axis. Also provided is an adapter for operably connecting with the connector. The adapter comprises a coupling mechanism for receiving and coupling with the connector upon application of a first pushing force to the connector so as to removably receive the connector in operably connected fashion. The coupling mechanism includes at least one slider operably connected to the adapter and moving in only a planar fashion in response to application of a pushing force to the connector. The coupling mechanism uncouples the connector from the adapter upon the application of only a second pushing force in the same direction and at the same location as the first pushing force, so as to cause said slider to move with respect to the adapter for withdrawal of the connector from the adapter.

The invention further includes a method of connecting and disconnecting an optical fiber connector and adapter comprising: applying a first pushing force to the connector towards the adapter so that the adapter receives the connector; moving a slider operably attached to the adapter in response to the first pushing force, until the connector is engaged with the adapter in an operable arrangement; applying only a second pushing force to the connector in the same direction and at the same location as the first pushing force so as to move a slider in response thereto, until the connector is disengaged from the adapter for withdrawal of the connector from the adapter.

The invention further includes an optical fiber interconnect system comprising an adapter having an open end leading to an interior operably configured for engaged receipt of a connector for carrying a ferrule therein. The adapter has at least one shutter operably mounted in its interior and being movable so as to have open and closed positions. The shutter is configured to be moved from a closed position to an open position upon contact with the connector received by the adapter, while avoiding contact with the ferrule's polished face of the connector. The shutter further includes a cam for contacting and being opened by said connector.

The optical fiber interconnect system further comprises a connector assembly comprising a modular contact having at least one angled latch proximate a first end thereof. A connector housing has an open end leading to an interior configured for engaged receipt of said modular contact therein. At least one opening in the connector housing for receipt of said angled latch when the modular contact is inserted therein so as to provide releasable retention of the modular contact within the connector housing. The connector housing is further configured to provide access to the angled latch from the front end of the connector assembly for disengagement of the modular contact from the front end of the connector assembly, when necessary.

The optical fiber interconnect system also comprises a modular contact that includes: a housing; a plug carrying at least one fiber optic cable received by the housing; and a rear body; and, the rear body having means for securely retaining the fiber optic cable without the need for crimping thereof. The means for securely retaining the fiber optic cable comprises a series of grooves on the exterior circumference of the rear body. Threads can be provided instead of grooves.

The optical fiber interconnect system includes a connector and an adapter and further includes a modular contact comprising a plastic body operably contained within the connector. A zero rotation assembly is operably associated with the modular contact. At least one rail is associated with the connector housing for aligned insertion of the connector into the adapter. The body has a groove molded therein for receipt of the zero rotation mechanism and a rear body having at least one slot and a series of grooves for facilitated connection of said optical fiber cable without the need for crimping thereof.

The invention also includes a method for assembling a fiber optic cable interconnect system comprising: cutting the jacket of the fiber optic cable to form a slot therein; inserting at least one thread of the strength member into said slot; and, rotating a holding bushing onto the rear body of a modular contact so as to interpose the strength member therebetween and thereby retaining the holding bushing on rear body of the contact. The material of the preferred embodiment is threads of Kevlar® though other similar materials should be considered as being within the scope of the invention.

The optical fiber interconnect system of the present invention includes a connector for carrying at least one optical fiber; an adapter having one end for receiving the connector and operably connecting it to another connector inserted at an opposite end; a holder for operably mounting the adapter to a panel; and, a locking mechanism operably associated with the holder and interposed between the connector and the adapter for preventing accidental disconnection of the connector from the adapter. The holder is configured to hold one end of the adapter substantially flat against the panel.

The invention further comprises a connector carrying at least one optical fiber; an adapter having one end for receiving the connector and operably connecting it to another connector inserted at an opposite end; the adapter including a push-push mechanism for receiving and retaining a connector at the first end thereof; the push-push mechanism having a neutral position that is off-center; and, a single spring member operably connected to the adapter to provide a biasing force to the push-push mechanism.

The optical fiber interconnect system also includes a connector having an engagement pin and carrying at least one optical fiber; an adapter having one end for receiving the connector and operably connecting it to another connector inserted at an opposite end; two spring members having first and second ends operably mounted to the adapter; two slider members slidably mounted on said adapter; the first end of each spring member being received within each slider member so as to spring bias the slider member and provide a neutral position that is off-center; the second end of each spring member being retained within the adapter; each slider engaging and retaining the engagement pin when the connector is inserted in the adapter; and, wherein application of a single pushing force on said connector serves to connect said connector to the adapter and application of only a second pushing force to the connector in the same direction as the first pushing force serves to automatically disconnect the connector from the adapter.

Another object of this invention is to provide a connector comprising a universal modular contact design enabling the connector to be disassembled, if necessary, from the front of the connector. This capability is especially important in high density environments. Angled latches are provided at the front corners of contact housing. The latches are angled to each other and use otherwise unused space, because a round plug occupies a square shaped area. This allows for a reduction in size over conventional contacts.

It is another object of the present invention to provide a zero rotation plug assembly wherein the plug has preferably four ribs positioned within a zero rotation frame to reduce friction in contrast to the flats of prior systems.

Yet another object of the invention is to provide a keying feature in the modular contact so as to prevent assembly thereof in the wrong orientation.

It is another object of the present invention to provide a rear bushing provided with a set of grooves or threads so as to allow cable termination without the need for traditional crimping and the damage to the cable that it can cause.

Another object of the invention is avoiding the need to use special needles or special low viscosity epoxy.

Yet another object of the present invention is to provide a contact that employs a plug that is a one-piece over molded structure having a plastic body and ceramic ferrule so as to provide a structure that is simpler and less expensive over prior plugs. Expensive, precise machined parts and the additional press-fit assembly operation are thereby avoided. The overmolded plug has a longer body than conventional plugs such as those of the '360 application so as to provide better support for the buffered fiber, protect epoxy from spilling on to the spring and avoid the need for additional tubing.

Another object of the present invention is the rear body of the contact assembly which is preferably a plastic molded part versus the machined metal part of the systems such as that of the '360 application. Accordingly, it is less expensive to manufacture and has a latching feature that facilitates faster assembly. The system of grooves or threads and slots along with the holding bushing provides a better cable retention without the need for crimping used in traditional systems.

It is another object of the present invention to provide an actuator that is made of hard plastic, as opposed to the elastomeric materials used by prior boots. A slot is provided along the length of the actuator of the present invention to enable it to open up and receive the fiber optic cable. In addition, slots in the cylindrical part of the actuator serve to make the two halves spring-like.

Yet another object of the present invention is to provide an adapter employing a parallel slider push-push engagement/disengagement mechanism as opposed to the oscillating swinger mechanism of the device of the '360 application. This enables use of the parallel slider mechanism in simplex or duplex. The parallel slider mechanism provides for simplified movement in only a single plane by avoiding movement in a vertical plane and employs a spring that has a less complex shape and is less expensive to fabricate. In contrast, the mechanism of the '360 application employs movement in three dimension. In further contrast to the '360 application wherein the neutral position was in the center, the neutral position of the mechanism of the present invention is off center. This offset neutral position allows the use of a single spring, instead of the three spring arrangement of the '360 application. This is because there is no need to provide a biasing force with respect to up and down movement.

Yet another object of the present invention is to provide an adapter design that eliminates complicated and precise parts in order to reduce the cost of manufacture. Towards that goal, metal shells and plastic housing halves are preferably hermaphroditic parts, requiring only a single stamp and a single mold.

Another object of the present invention is to provide an adapter that is substantially shorter than a typical adapter of the construction of the '360 application since parallel slider mechanism is almost twice shorter than swinger mechanism by the nature of it's design.

Yet another object of the present invention is to provide a rail on the connector body bottom for the function of opening the shutter when the front end of the rail contacts the cam of the shutter so as to avoid contacting the polished face of the ferrule.

A further object of the present invention is to provide adapter holders for front panel or back panel mounting of miniature adapters on instruments in simplex, duplex, quad, or any other custom configurations. Numerous other features and advantages of the present invention will become apparent from the following detailed description of the invention, the accompanying drawings and the appended claims.

BRIEF DESCRIPTION OF THE DRAWINGS

FIG. 1A is a cross-sectional view of the universal modular contact along its longitudinal axis, with the plug in the pre-termination position.

FIG. 1B is a cross-sectional view of the universal modular contact along its longitudinal axis, with the plug in the termination position.

FIG. 4B is a perspective front view of the actuator.

FIG. 4C is a rear perspective view of the actuator.

FIG. 8B is a side view of the locking mechanism in the open position.

FIG. 8C is a side view of the locking mechanism in the locked position.

FIGS. 10A-10F are schematic diagrams of the movement of the slider during the engagement and disengagement operations of the push-push mechanism.

DETAILED DESCRIPTION OF THE DRAWINGS

Figure 1:
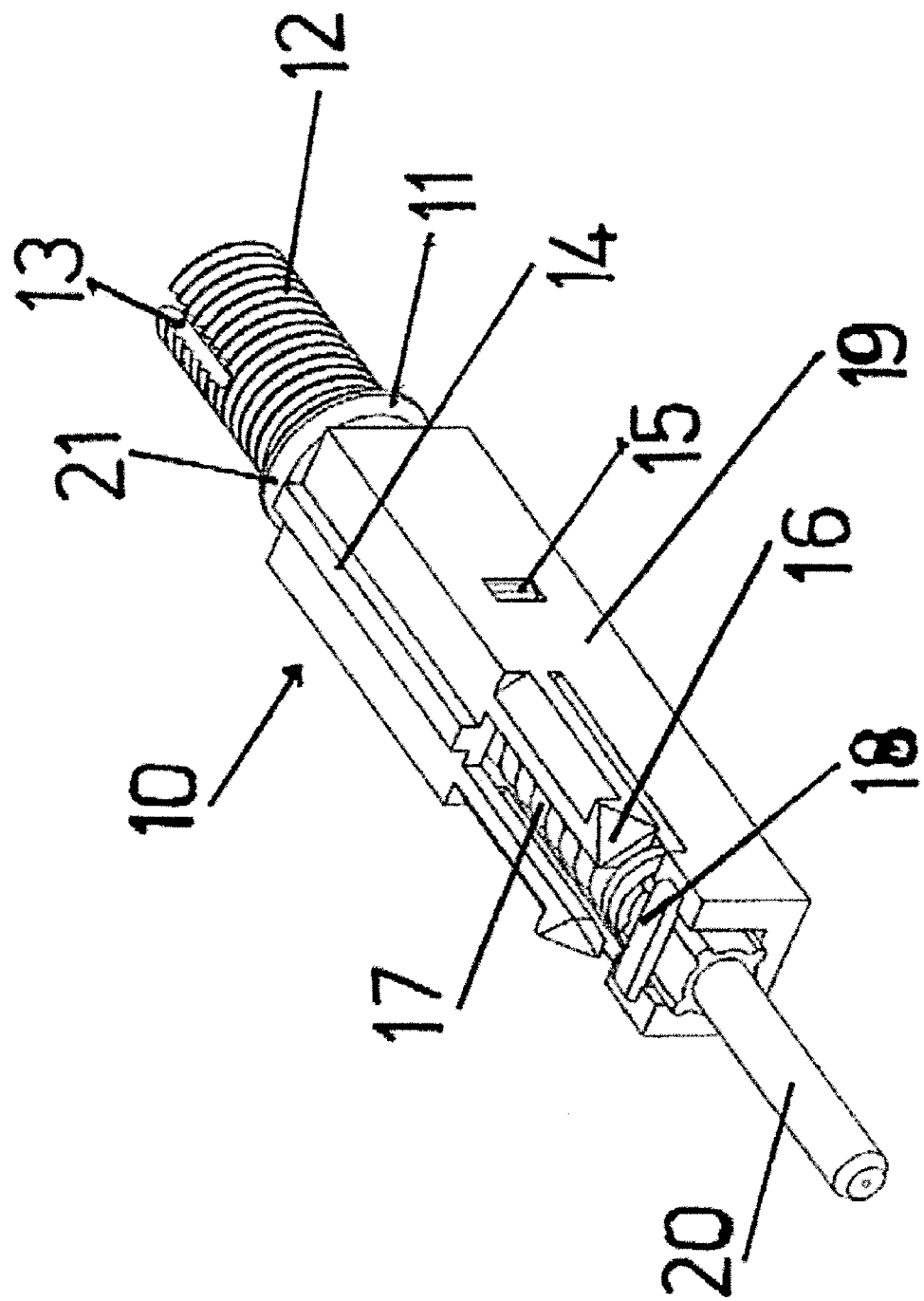
FIG. 1 is a perspective view of the universal modular contact.

By way of disclosing a preferred embodiment, and not by way of limitation, FIG. 1 shows the universal modular contact assembly 10 which in the preferred embodiment is made of plastic. Assembly 10 of FIG. 1 has a housing 19 which holds plug 20, zero rotation frame 18, and spring 17. Housing 19 has a pair of 45 degree latches 16, a pair of openings 15 and rail 14 along the top of its exterior as viewed in FIG. 1. Angled latches 16 allow for disassembly, as necessary, of contact 10 from the connector 30 from the front direction as viewed in FIG. 3 and FIG. 4A. This is also especially beneficial in high density environments such as multi-channel designs. To disengage contact 10 from housing 31, a forward force is applied to angled latches which can be at a 45 degree angle, from the front of connector 30 so as to disengage latches 16 from openings 41 in housing 31 by pressing them toward the longitudinal axis of the contact. Latches of other angles that provide for such disassembly from a direction substantially parallel to the longitudinal axis of connector 30, should be deemed as likewise being within the scope of the invention. Placing the latches on the corners allow for a reduced overall size. Because round plug 20 is in a square area of connector 30, the corners comprise unused space.

Connected to housing 19 is rear body 21 which is shown in FIG. 1 as having threads or grooves 12 about its periphery and pair of slots 13 along part of its length. These features along with the holding bushing 46 shown on FIG. 4A allow for cable termination without traditional crimping. In this embodiment plug 20 has a body made of plastic and has an over molded ceramic ferrule. Use of other materials should be deemed as being within the scope of the invention. This enables a simpler structure and does not require expensive, precise machined parts and additional press-fit assembly operations. Rear body 21 is preferably a plastic molded part as opposed to a machined metal part. Rail 14 is provided for keying thereof with respect to the adapter, to eliminate assembly thereof in the wrong orientation.

A cross-sectional view of contact 10 is shown in FIG. 1A. Spring 17 surrounds plug 20. Plug 20 is shown to the left of opening 21A in rear body 21. This is the pre-termination position for plug 20. In FIG. 1B, the plug 20 is shown pushed back against the opening 21A of rear body 21 with spring 17 compressed. This is the termination position for plug 20.

In the preferred embodiment a shorter over molded plug 20 is used which is easier to mold and serves to provide more space for plug floating purposes. The termination process requires a simple tool (not shown) for pushing plug 20 against the wall of opening 21A of rear body 21 within the contact housing during epoxy injection and fiber insertion. The tool is then removed. In that way, the rear end of plug 20 is beyond the end of the spring 17 as shown in FIG. 1B. This eliminates the risk of contaminating the spring with the epoxy/adhesive and "freezing" the connector. This provides a long channel without interruption to insert the fiber and the entrance to plug 20 is moved as far away as possible from spring 17. In that way spring 17 does not interrupt the smooth passageway for inserting the fiber.

This method of termination allows for the plug 20 to be moved back far enough to create a substantially gapless passage for the syringe needle and inserting the needle thereof in order to fill plug 20 with adhesive prior to inserting the optical fiber. This is done without the help of additional parts such as the plastic tube used by some prior devices, which in some cases stays with the device after termination.

Figure 2:
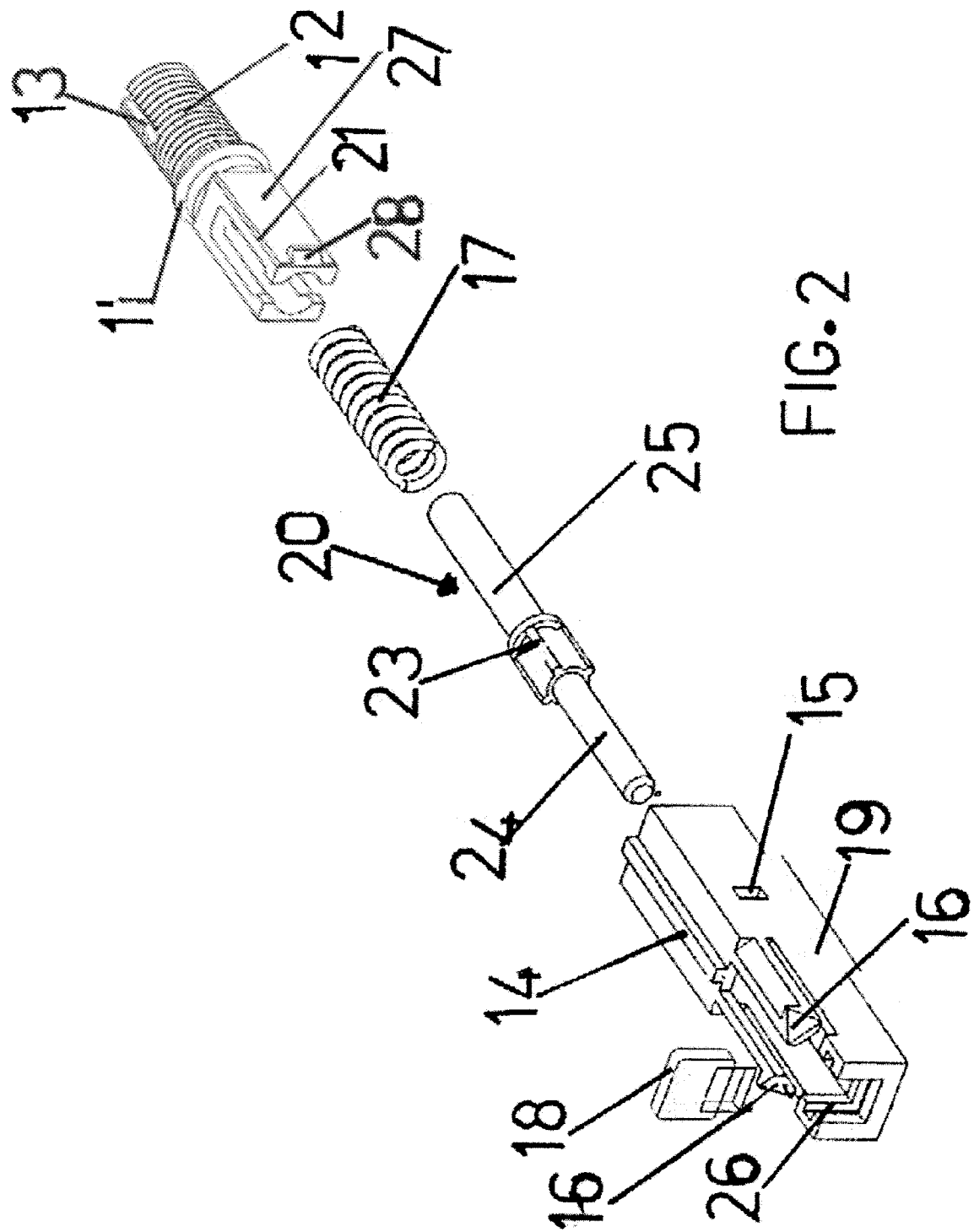
FIG. 2 is an exploded view of the universal modular contact.

Turning to FIG. 2, an exploded view of contact 10 is provided. Housing 19 has a pair of 45 degree latches 16, groove 26 for receiving zero rotation frame 18 and rail 14 for correct alignment and orientation. Housing 19 has a hollow interior configured to receive plug assembly 20 at the far end as viewed in FIG. 2. Plug assembly 20 includes ferrule 24, overmolded plastic plug 25 and a set of four longitudinally arranged sliding ribs 23 interposed therebetween. Spring 17 slips over plug 25 and its front end is stopped by the bottom ring of ribs 23. Rear body 21 has two front latches 27 and flange 11, threads or grooves 12 and slots 13 on its back end. Internal ends (not shown) of latches 27 contact and longitudinally compress spring 17 around plug 25. The internal stop (not shown) of rear body 21 is configured so as to abut far end of spring 17, while receiving plug 25 within its interior.

When assembled as in FIG. 1, with reference to FIG. 2, plug assembly 20 is received within housing 19 and zero rotation frame 18 is received in groove 26. Frame 18 engages ribs 23 and prevents undesired rotation of plug assembly 20 while allowing plug 20 to move up-down, left-right, and forward-back. The ribs 23 contacting the zero rotation frame 18 serve to reduce friction as compared to prior systems using flat surfaces on the plugs. As rear body 21 is pushed towards housing 19, spring 17 is compressed, plug 25 is received between latches 27, and latches 27 are pushed towards each other until teeth 28 on each side of latches 27 snap into and are retained within the two openings 15 on each side of housing 19.

Figure 3:
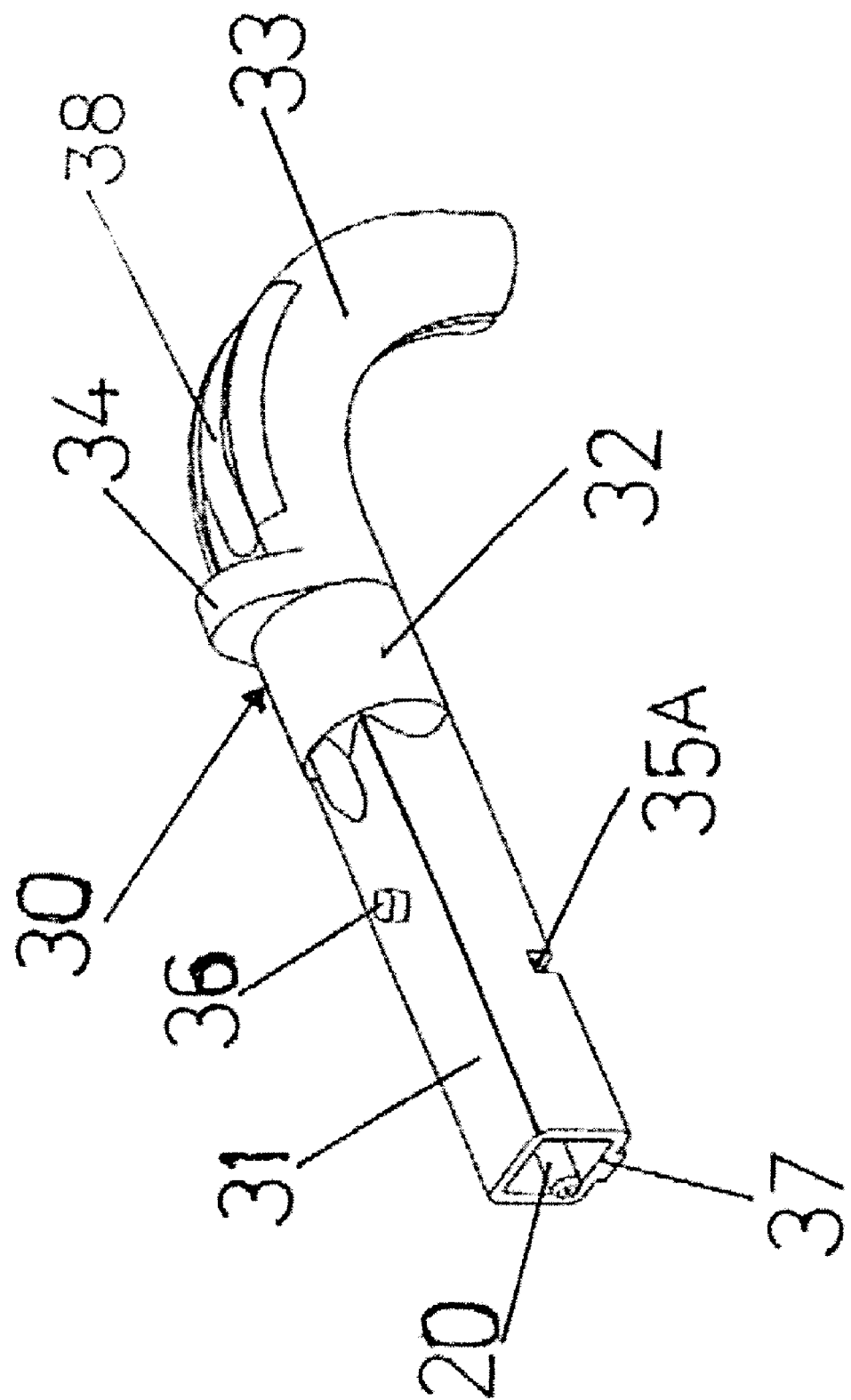
FIG. 3 is a perspective view of the connector.

The assembled connector 30 of the preferred embodiment is shown in FIG. 3. Plug assembly 20 is shown within connector housing 31. Connector housing 31 has alignment rail 37 on its bottom side as viewed in FIG. 3, openings 35A on each side thereof, an engagement pin 36, and cylindrical part 32. Connector housing 31 is shown connected to actuator 33 with actuating tab 34 therebetween.

Figure 4A:
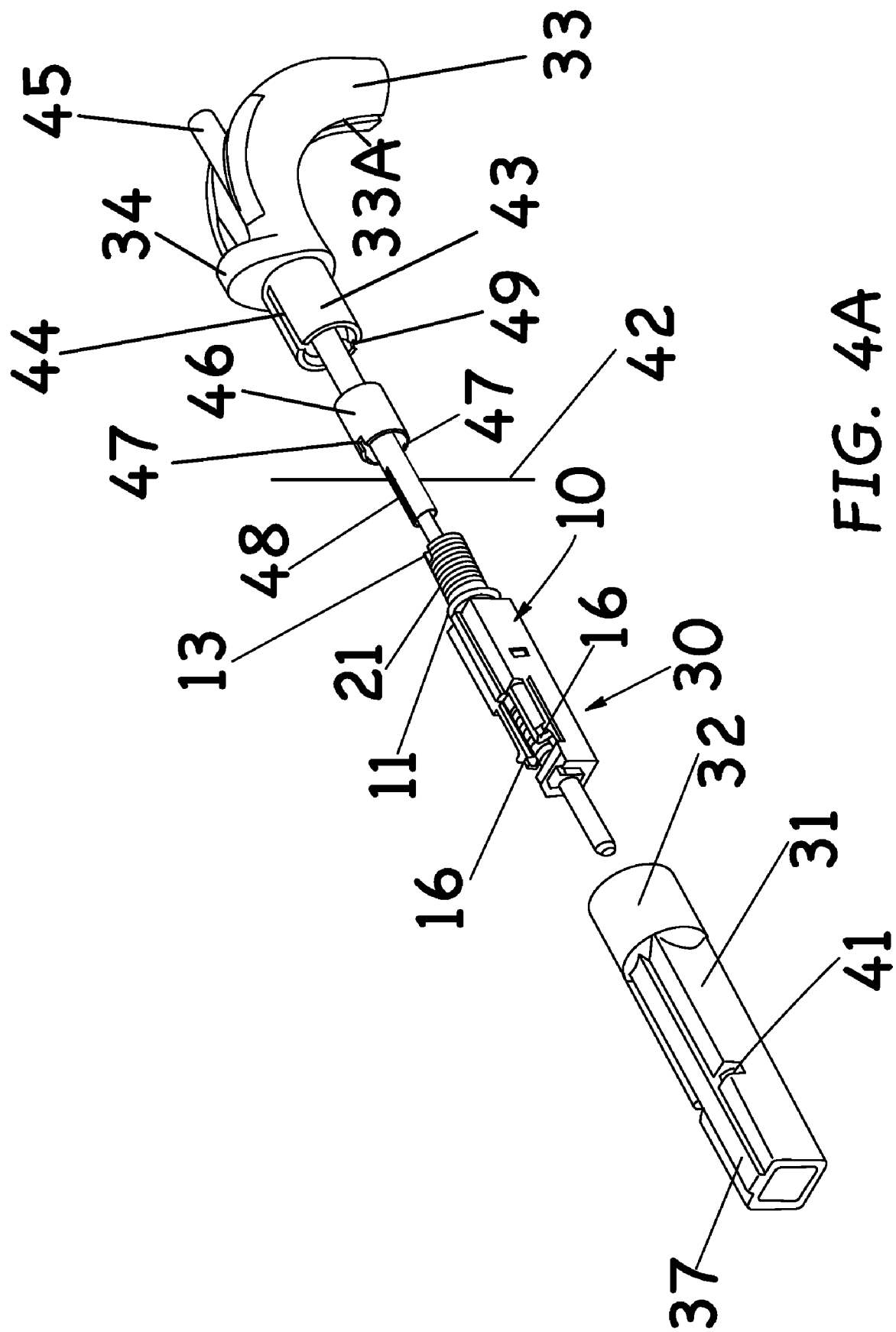
FIG. 4A is an exploded view of the connector with the rail up.

An exploded view of connector assembly 30 is shown in FIG. 4A. Contact assembly 10 has angled latches 16, rear body 21 with flange 11 and slots 13. Connector housing 31 has orientation rail 37 on its top side and a pair of openings 41 on its sides, as well as cylindrical region 32 as viewed in FIG. 4A. Connector housing 31 is shown with rail 37 along its bottom surface as viewed in FIG. 3.

As shown in FIG. 4A, Fiber optic cable 45 passes through interior passage of actuator 33. Two slots 44 are provided in cylindrical region 43 of actuator 33. Lips 49 are provided on the interior front edge of cylindrical region 43 of actuator 33 for engagement with flange 11 of rear body 21. Fiber optic cable 45 next passes through holding bushing 46 with a pair of slots 47 formed therein. Strands of Kevlar® 42 or other comparable material are threaded between the pair of jacket cuts formed in fiber optic cable 45 and are wound around grooves or threads 12 of rear body 21 by rotating the holding bushing 46. When assembled, latches 16 are received and detachably retained within openings 41 of housing 31. Holding bushing 46 is twisted around Kevlar® strands 42 and slides over threaded portion of rear body 21 so as to thread strands 42 over grooves 12 of rear body 21. Interior lips 49 of cylindrical region 43 snap over flange 11 before entering cylindrical region 32 of housing 31 as shown in FIG. 3. Internal diameter of the cylindrical region 32 of the housing 31 is designed in such way that lips 49 of the cylindrical area 43 cannot open while being inside of the connector housing. This prevents actuator 33 from undesirable accidental withdrawal from housing 31.

Front and rear views of actuator 33 are shown in FIGS. 4B and 4C respectively. In the preferred embodiment, actuator 33 is made from hard plastic as opposed to the elastomeric materials of prior systems. A slot 38 is provided along the back length of actuator 33 to provide a channel for the fiber optic cable. This allows for spring-like separation thereof for insertion of the cable. Cable channel 38 is provided in the back of actuator 33 and under the actuating tab 34 for the fiber optic cable to pass through. Cylindrical region 43 of actuator 33 has two slots 44 to provide for spring-like separation and facilitated attachment to rear body 21 of connector 30. Actuating tab 34 is provided with an actuating zone 35B. The insertion of connector 30 into adapter 50 in an engaged and retained relationship is accomplished by applying a force P to tab 34 at zone 35B. A stylus, pen point, paper clip end or the like may be used to apply this force P.

A pair of snap tabs 39 is provided at the bottom end of cable channel 38 and serve to hold the fiber optic cable 45 within channel 38. A pair of snap lips 49 is provided inside the far end of cylindrical region 43 to snap over flange 11 when assembled as shown in FIG. 3.

Figure 5:
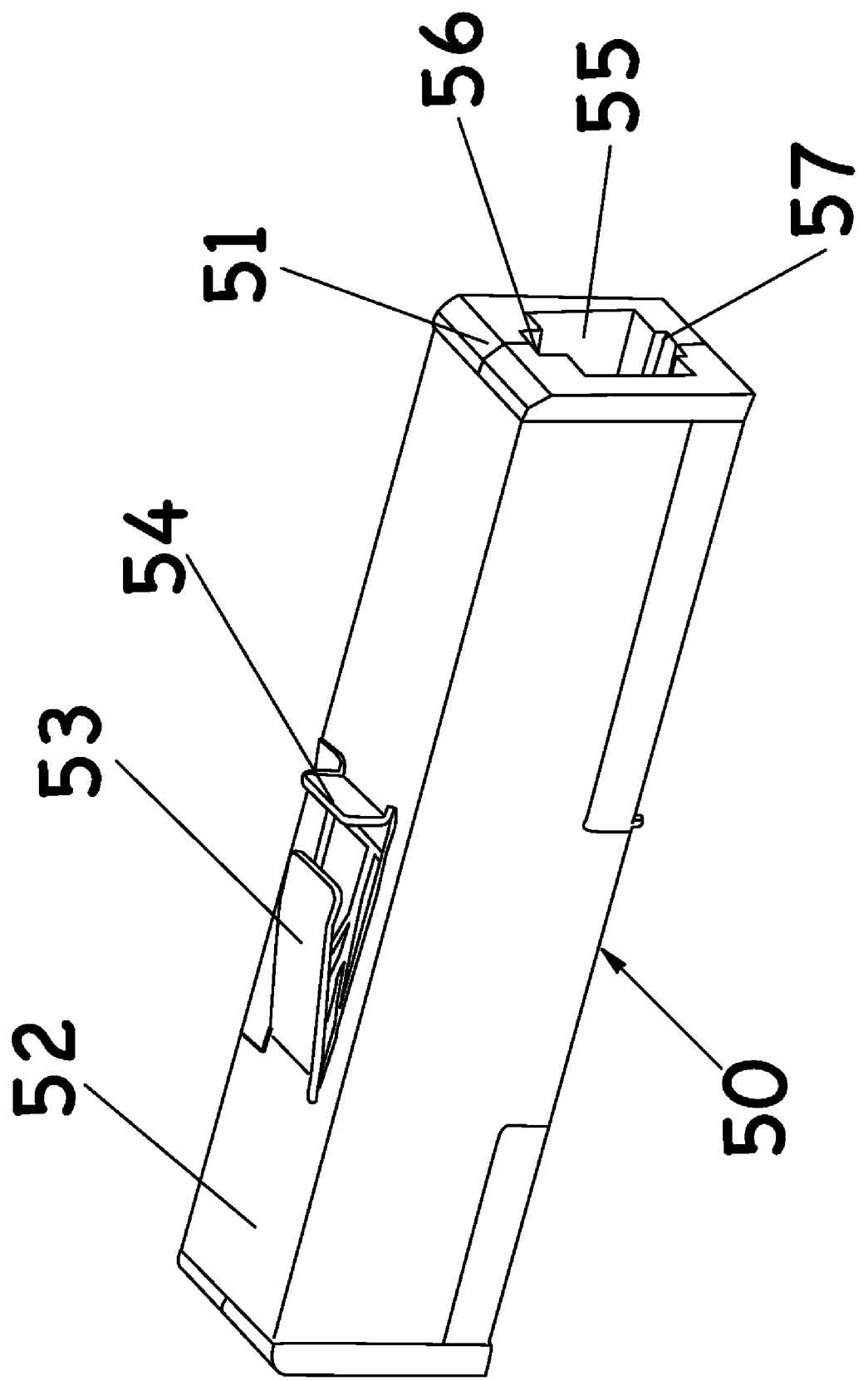
FIG. 5 is a perspective view of the adapter.

Turning to FIG. 5, adapter 50 is shown in assembled fashion. A pair of metal shells 52 surrounds the exterior of the plastic housing 51 of adapter 50. Open ends or apertures 55 for receiving connectors are provided at each end of plastic housing 51. Aperture 55 spanning the interior of adapter 50 has groove 56 along its interior at its top for passage of the engagement pin 36 of connector 30 there through. Likewise, groove 57 is provided along the interior of adapter 50 near the bottom of aperture 55 to enable the rail 37 of connector 30 to pass there through. A pair of latches 53 is provided on the top and bottom of the metal shells 52. Communicating with apertures 55 are groove 56 to enable passage there through of the engagement pin on the connectors; and, groove 57 to enable the connector rails to pass there through.

Figure 6:
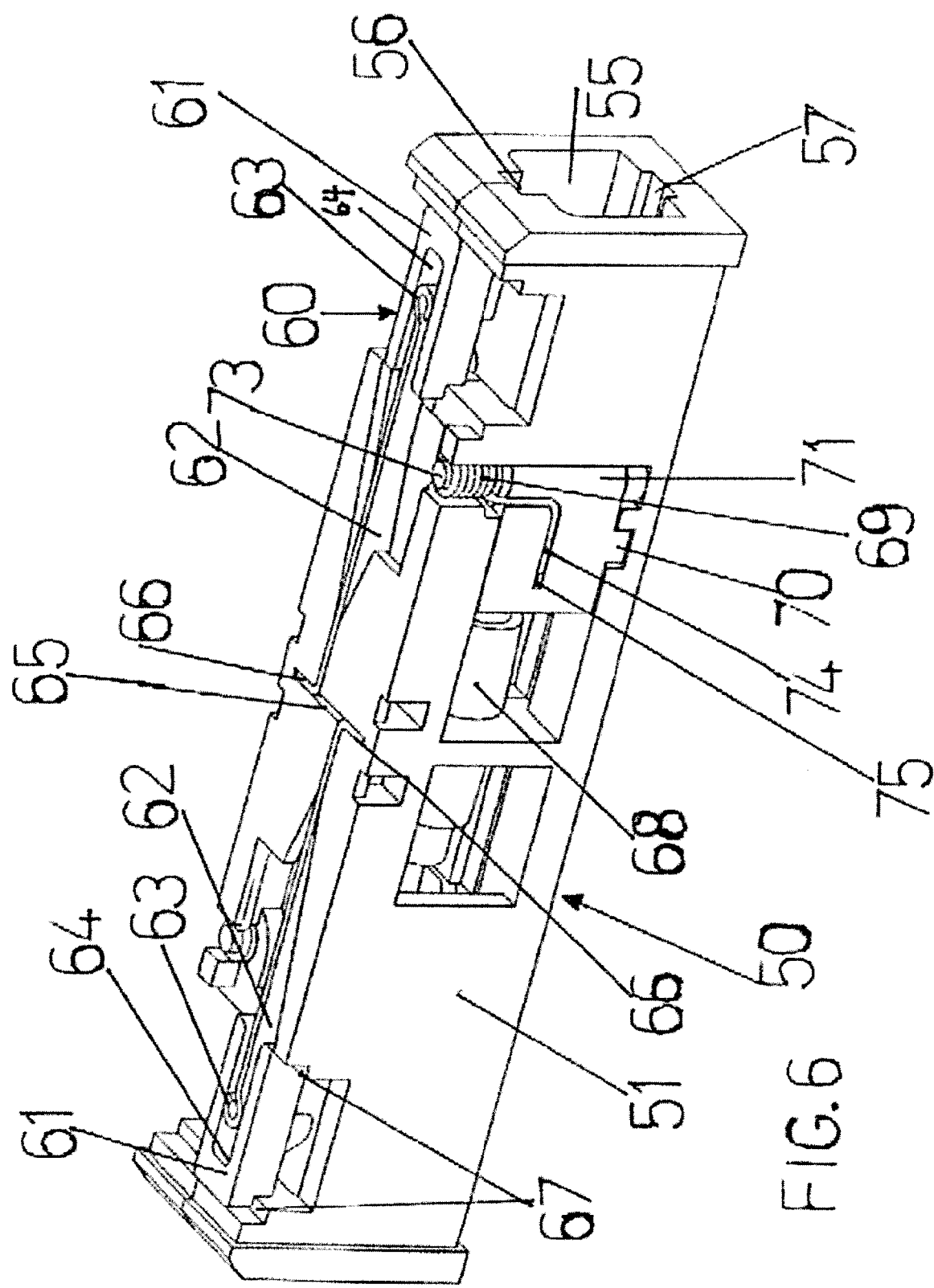
FIG. 6 is a perspective exposed view of the adapter.

An exposed view of adapter 50 with metal shells 52 removed is shown in FIG. 6. In this embodiment, plastic housing 51 is formed from two identical halves. Adapter 50 includes a pair of push-push engage/disengage mechanisms 60 which include leaf springs 62, and sliders 61. Apertures 55 at each end of housing 51 each have engagement pin groove 56 at its top and connector rail groove 57 at the bottom. Looped ends 63 of leaf springs 62 are placed in grooves 64 of sliders 61 in the top of plastic housing 51. Sliders 61 move along slider rails 67 formed in housing 51. Stationary ends 66 of leaf springs 62 are received in grooves 65 of housing 51.

Also shown within the interior of housing 51 in FIG. 6 are alignment sleeve barrels 68, a pair of shutters 71 each having shutter cam 70 for opening shutter 71, torsion spring 69, torsion spring pin 73 and torsion spring groove 75. Not shown in FIG. 6 within barrels 68 is an alignment sleeve that can freely move inside of barrels 68, so that it can optimally align two ferrules engaged in physical, end-to-end contact from two opposite ends of the adapter 50.

Figure 7:
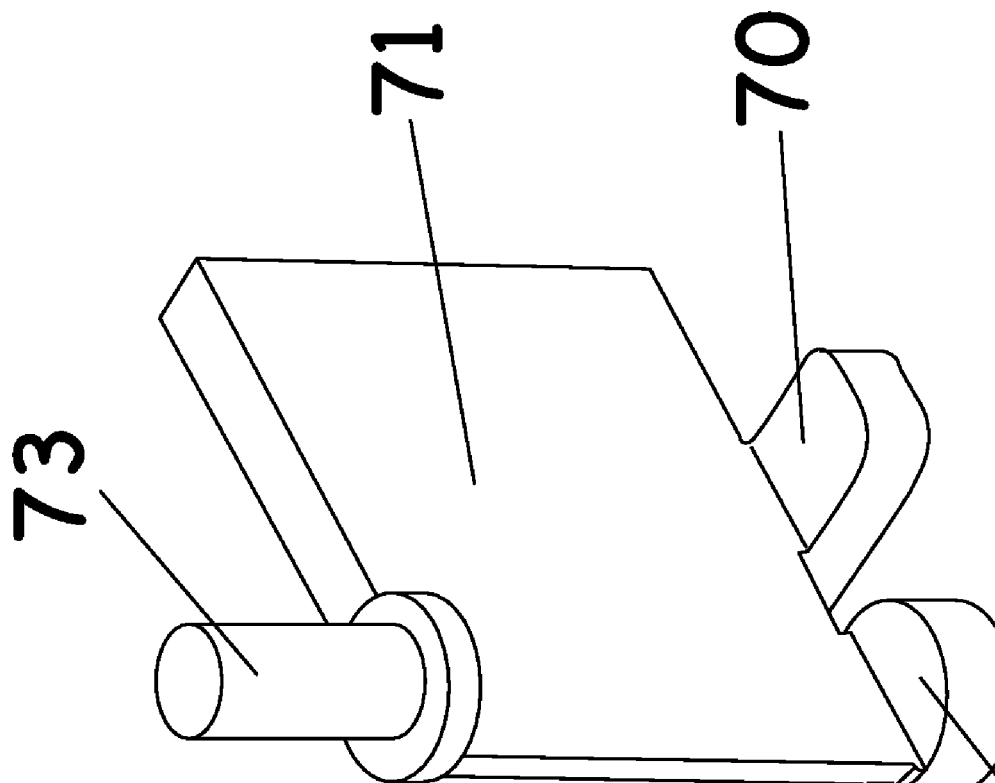
FIG. 7 is a perspective view of the shutter.

Shutter 71 of FIGS. 6 and 7 is configured so as to protect the ferrule face from damage and contamination as well as to protect the user's eyes. Insertion of a connector 30 within the adapter 50 (not shown) will serve to open shutter 71 by rail 37 of connector housing 31 pushing on shutter cam 70 without contacting the polished end of the ferrule of plug assembly 20. Torsion spring attached to shutter 71 will apply a biasing force tending to close shutter 71 when the connector 30 is removed from the adapter 50 (not shown). Opening of shutter 71 opens access to the plug assembly 20 so that it can be engaged in operable physical end-to-end contact with an identical second plug assembly (not shown) introduced into adapter 50 from the opposite end.

FIG. 7 shows shutter 71 having torsion spring pin 73 at its top and lower rest 72 at its bottom. Shutter 71 has cam 70 towards its bottom portion for opening shutter 71. Shutter 71 is engaged and opened when rail 37 of connector housing 31 contacts cam 70, not by contact with the ferrule within the connector 30. Accordingly, with cam 70 at the bottom of shutter 71, there is no need for a special cam at its top, thereby making it simpler to mold and less expensive to manufacture. Torsion spring 69 has a simpler and more compact shape than other types of springs such as serpentine springs of prior assemblies, thereby making it less expensive and occupying less space in the upper area of the adapter 50.

Figure 8A:
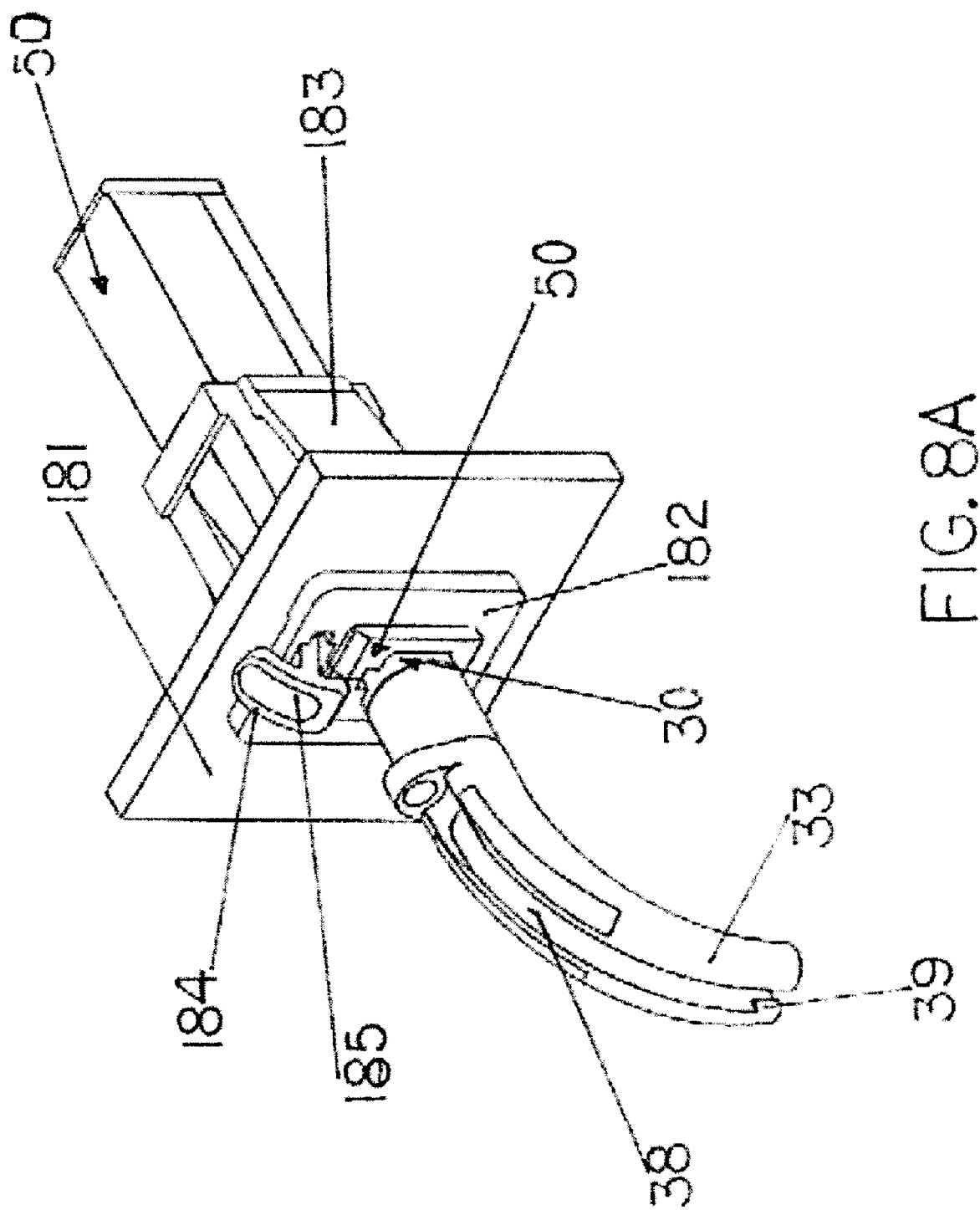
FIG. 8A is a perspective view of the locking mechanism.

Turning to FIG. 8A, the locking mechanism for the connector 30 with respect to the adapter 50 is shown, which prevents accidental push action to the connector which can lead to undesired disconnection of the connector 30 from adapter 50. Stopper 184 has either an open position shown in FIG. 8B or a locking position shown in FIG. 8C. In the preferred embodiment, stopper 184 has no intermediate position between said open position of FIG. 8B or the locked position of FIG. 8C. Stopper 184 has actuating zone 185 for locking the push-push mechanism of which actuator 33 is a part.

Front panel or back plane 181 is shown carrying holder 182 in FIG. 8A. Holder 182 has two holder latches 183 for reliably mounting holder 182 into the opening of the front panel or back plane 181 by snapping it in. Adapter 50 is held by holder 182 using adapter latches 53 (shown on FIG. 5) virtually flat against panel 181. Holder latches 183 provide for panel thickness compensation. Holder 182 can provide for holding a single adapter 50 as shown in FIG. 8A or for gang mounting of several adapters on the panel.

As shown in FIGS. 8B and 8C, latches 183 each have a series of steps along its side that serve to engage and retain holder 182 in panels 181 of varying thickness and compensate for such panel thickness. The panel 181 is held between the back face of holder 182 and the appropriate step of latch 183. In this way, new holders 182 can be snapped into the panel 181 manually without the need for tools and the mounting latches 183 provide for use thereof with different panel thicknesses. Alternatively, holder 182 can provide for a variety of panel mounting patterns involving different numbers of adapters. Such configurations can include simplex, duplex and quad configurations.

FIGS. 8B and 8C show the locking mechanism in the open position and closed position respectively. The locking mechanism prevents disengagement of the connector 30 from the adapter 50. FIG. 8B shows the connector 30 unlocked. Stopper 184 is in the fixed upper position. Stopper 184 is operated with a stylus or the like. As shown, holder 182 is mounted on front panel or back plane 181. By pushing on actuating tab 34 of actuator 33, the push-push mechanism is activated and connector 30 is disengaged from adapter 50 if it was initially in the engaged position or vice versa.

FIG. 8C shows the connector 30 locked. Stopper 184 is shown in the lowered fixed position where it is interposed between connector 30 and adapter 50. When stopper 184 is in this position, pushing on actuating tab 34 will not result in activation of the push-push mechanism. Accordingly, connector 30 and adapter 50 remain engaged.

Figure 8D:
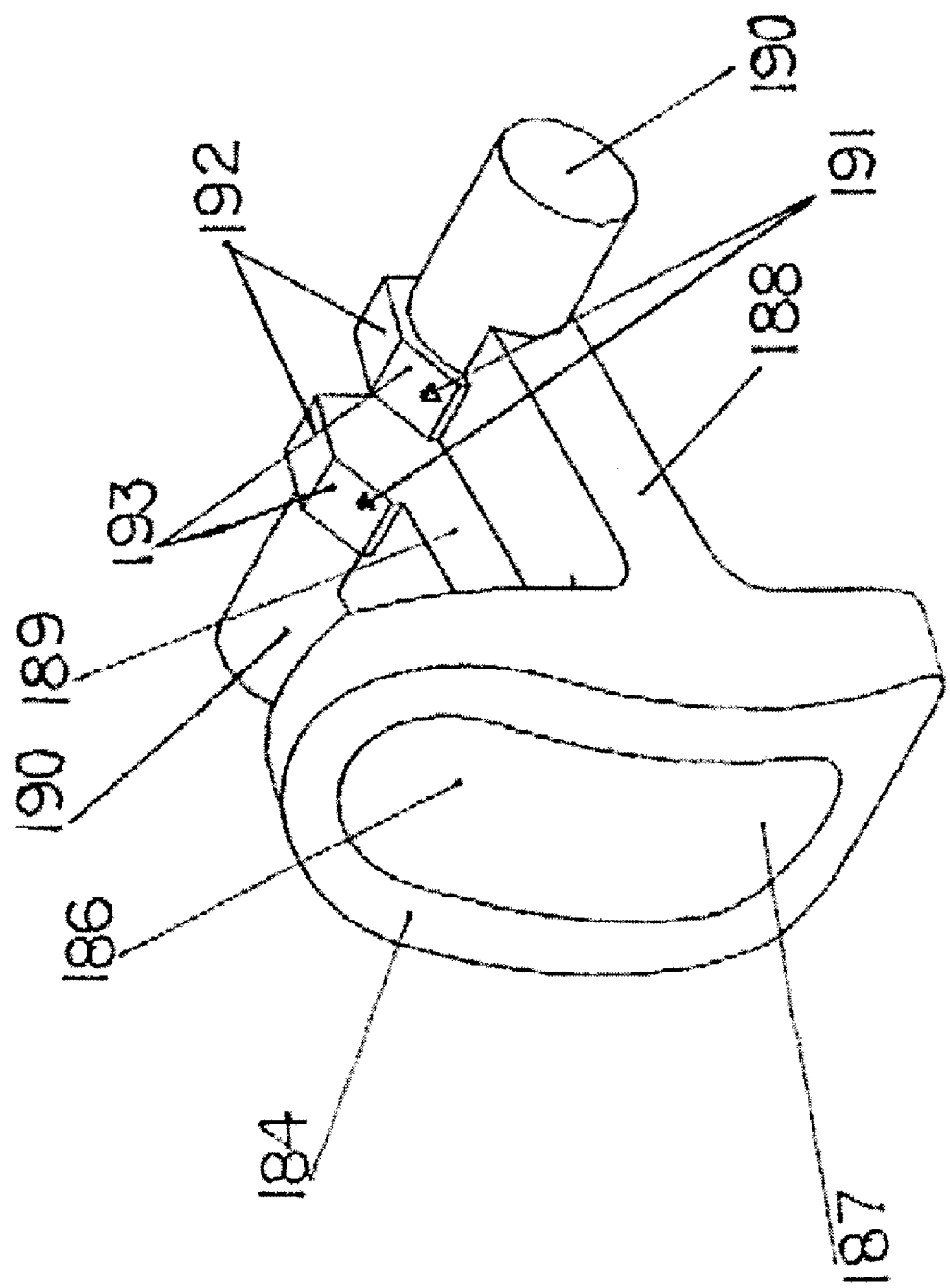
FIG. 8D is a perspective view of the stopper.

A detailed view of stopper 184 is shown in FIG. 8D. Stopper 184 rotates about resilient pivoting half-shafts 190. Pushing on upper actuating zone 186 with a stylus or the like, serves to rotate stopper 184 upward because it is off-center, so as to unlock the push-push mechanism. In contrast, pushing on lower actuating zone 187 with a stylus or the like, serves to rotate stopper downward into the locking position so as to be interposed between connector 30 and adapter 50. A pair of legs 188 connects upper and lower actuating zones 186 and 187 and half-shafts 190. A gap 189 is provided between half-shafts 190 so as to provide resilience needed to snap stopper 184 into place in spring component 195 provided on holder 182. Cams 191 are provided on half-shafts 190 with locking position flats 192 and unlocking position flats 193 for retention of the stopper 184 in the locked and unlocked positions, respectively.

Figure 8F:
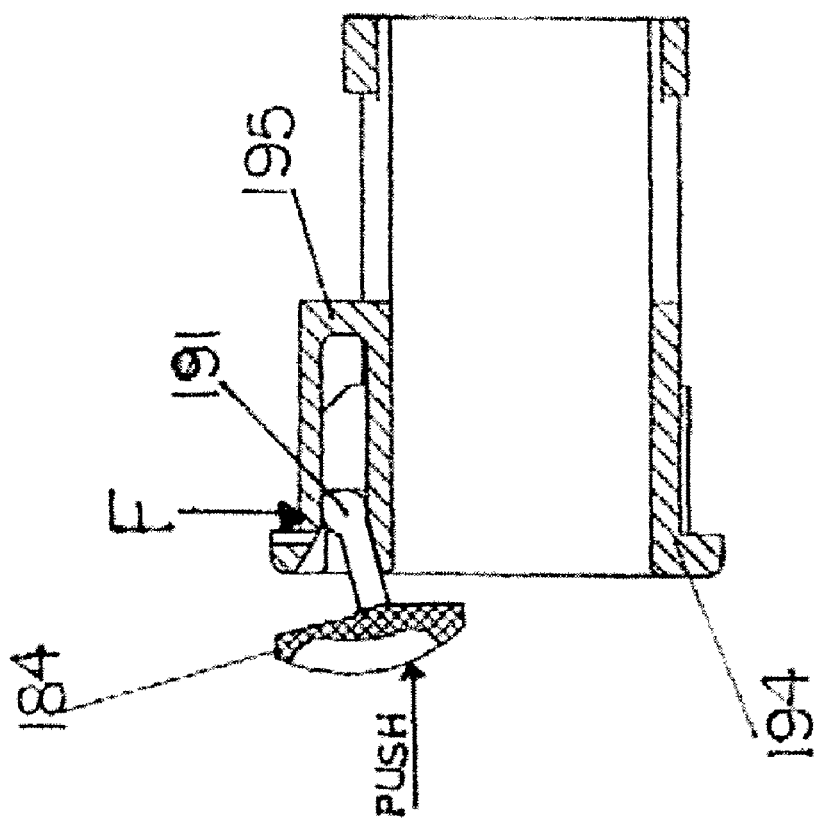
FIG. 8F is a side cross-sectional view of the locking mechanism in the locked position.
Figure 8E:
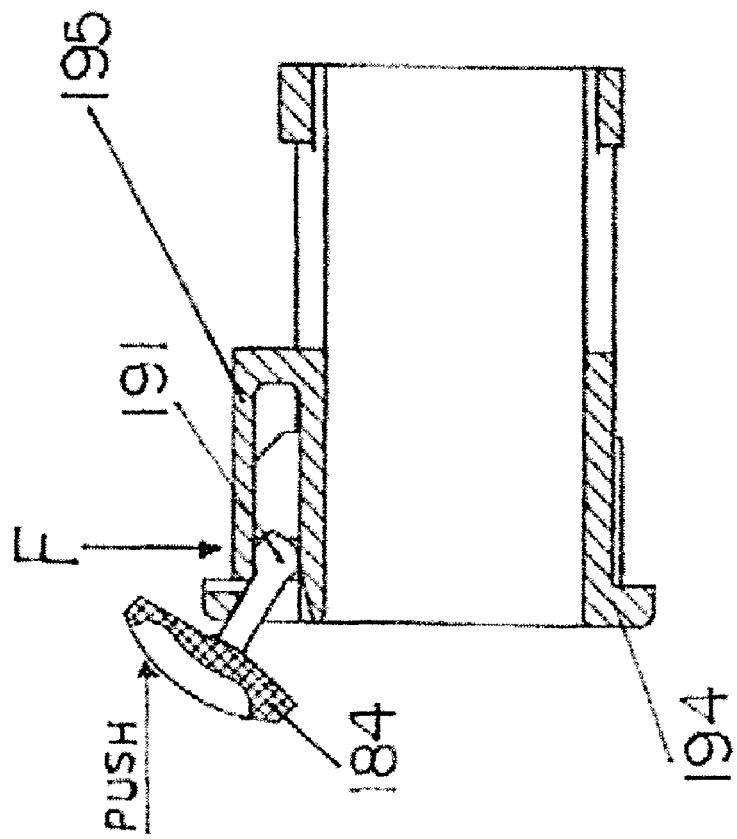
FIG. 8E is a side cross-sectional view of the locking mechanism in the open position.

FIGS. 8E and 8F show the locking mechanism, without the connector and adapter. Stopper 184 is shown mounted in plastic spring component 195 of holder body 194. Plastic spring 195 serves to apply a downward spring force shown as F on cams 191 of stopper 184. Pushing upper half of stopper 184 unlocks the push-push mechanism.

In FIG. 8F, pushing on bottom half of stopper 184 locks the push-push mechanism. Spring force F on cams 191 from plastic spring 195 retains stopper 184 in the locked position. As shown in FIG. 8F, flats 192 of cams 191 (shown in FIG. 8D) are flush with the top interior surface of spring 195 when stopper 184 is in the locked position. Conversely, as shown in FIG. 8E, when stopper 184 is in the unlocked position, flats 193 of cams 191 (shown in FIG. 8D) are flush with the top interior surface of spring 195.

Figure 9A:
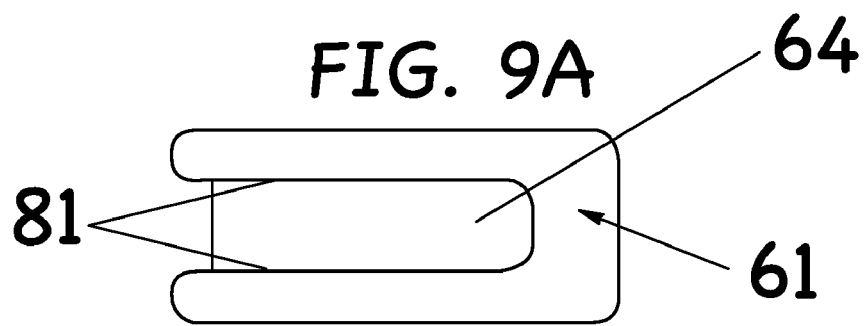
FIG. 9A is a top view of the slider.

In FIG. 9A, the top view of slider 61 is shown. Vertical sliding surfaces 81 of each slider 61 enable one of the looped ends 63 of each leaf spring 62 (shown in FIG. 6) to move within the interior of the longitudinal opening in the top of the sliders 61.

Figure 9B:
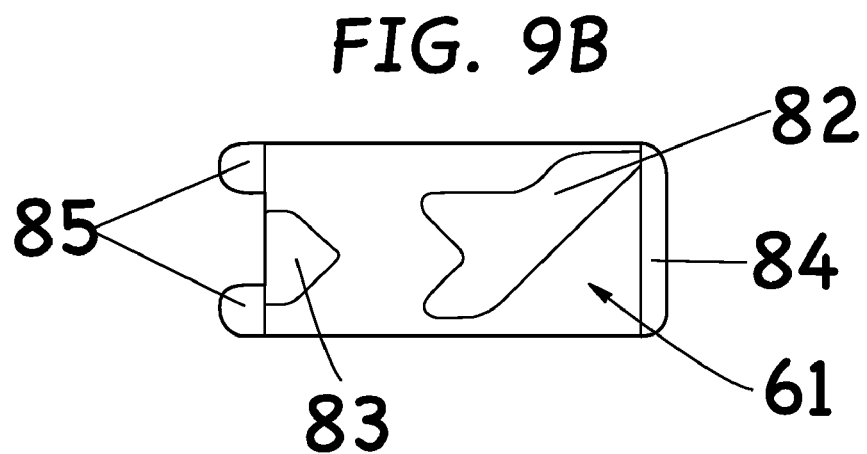
FIG. 9B is the bottom view of the slider.
Figure 9C:
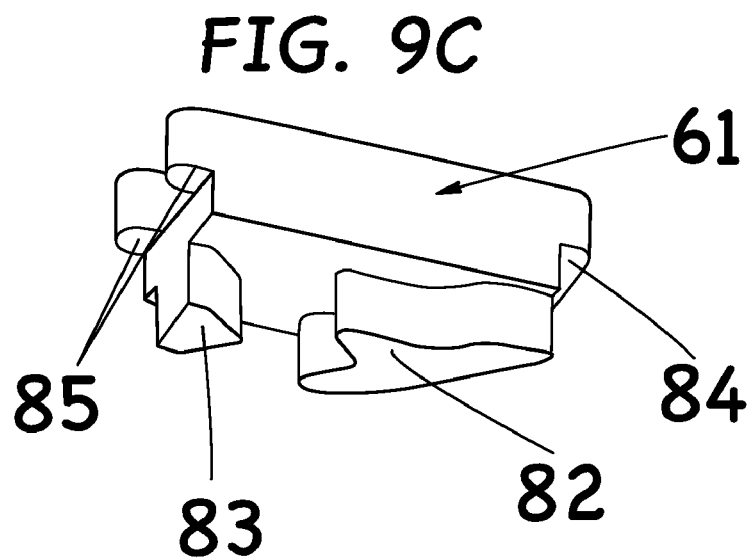
FIG. 9C is a perspective bottom view of the slider.

The bottom view of slider 61 is shown in FIG. 9B. Sliding surfaces 84, 85 slide along rails 67 (shown in FIG. 6) of adapter 50. Slider 61 bottom surface also has first cam 82 and second cam 83. The isometric view of slider 61 of FIG. 9C shows: sliding surfaces 84, 85; first cam 82 and second cam 83.

Turning to the diagrams of FIGS. 10A to 10F, the interaction of the engagement pin 36 and slider 61 is shown schematically during insertion and withdrawal of connector 30 into or from adapter 50. FIGS. 10A to 10F show the cams 82, 83 and pin 36 upward from the bottom side of slider 61. On these diagrams the arrows $F_R$ and $F_L$ represent right and left biasing forces provided by leaf spring 62 on slider 61 (see FIG. 6). In operation, connection is initiated by applying a first "push" action by applying a pushing force to connector 30 at tab 34 in the direction of arrow $P_{P1}$ of FIG. 10A until it is received in opening 55 of adapter 50 (of FIG. 6).

Figure 10D:
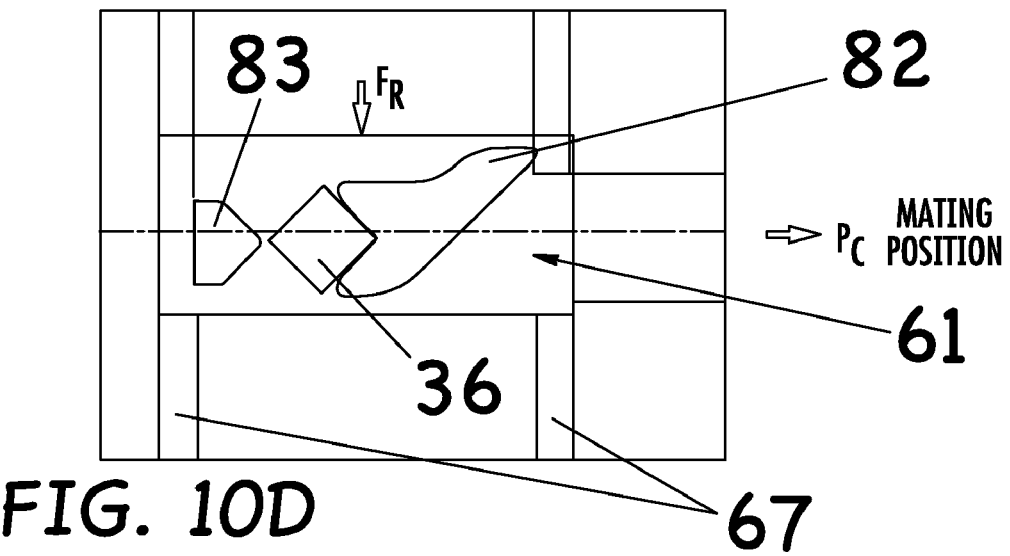

This "initial" push force on the connector 30 with respect to adapter 50 is represented by $P_{P1}$ in FIGS. 10A and 10B. As engagement pin 36 moves inward toward first cam 82 and moves along the front angled face of first cam 82, slider 61 moves upward along sliding rails 67 as shown in FIG. 10B. In FIGS. 10A to 10F, the directions "upward" and "downward" should be understood as "right" and "left" respectively in the actual connector and adapter. Leaf spring 62 captured in housing 51 (shown in FIG. 6) applies downward biasing force $F_R$ tending to resist and overcome such upward movement by slider 61. Engagement pin 36 continues to move inward as part of the initial push operation, as shown in FIG. 10C, until it is stopped by second cam 83 and the inward pushing force ceases. Because pin 36 no longer contacts the angled front surface of cam 82, slider 61 is no longer driven upward. Instead right biasing force $F_R$ provided by the leaf spring 62 tends to push slider 61 downward and towards a neutral position. The neutral position in the system of the present invention is off center, in contrast to prior systems wherein the neutral position is in the center. The fact that the neutral position is off-center enables the use of only one spring 62.

In reaction thereto, slider 61 moves upward and pin 36 moves outward along the angled face of second cam 83 with respect to FIG. 10C. The internal spring force of connector 30 is shown as the arrow signifying outward force $P_C$ in FIGS. 10C and 10D.

As slider 61 keeps moving along the angled front face of second cam 83, pin 36 is captured by the correspondingly shaped back side of first cam 82, so as to reach the mating position of FIG. 10D.

Figure 10E:
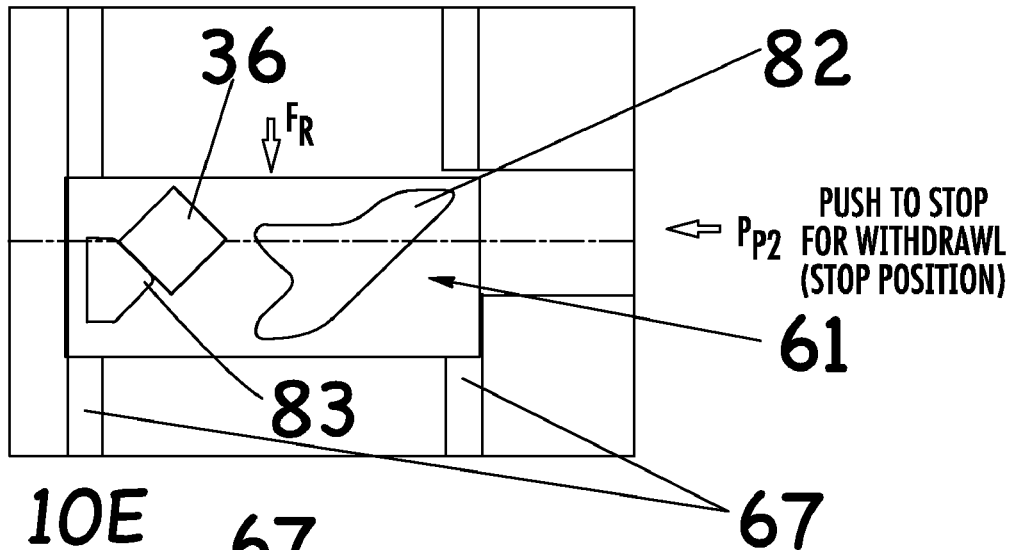
Figure 10F:
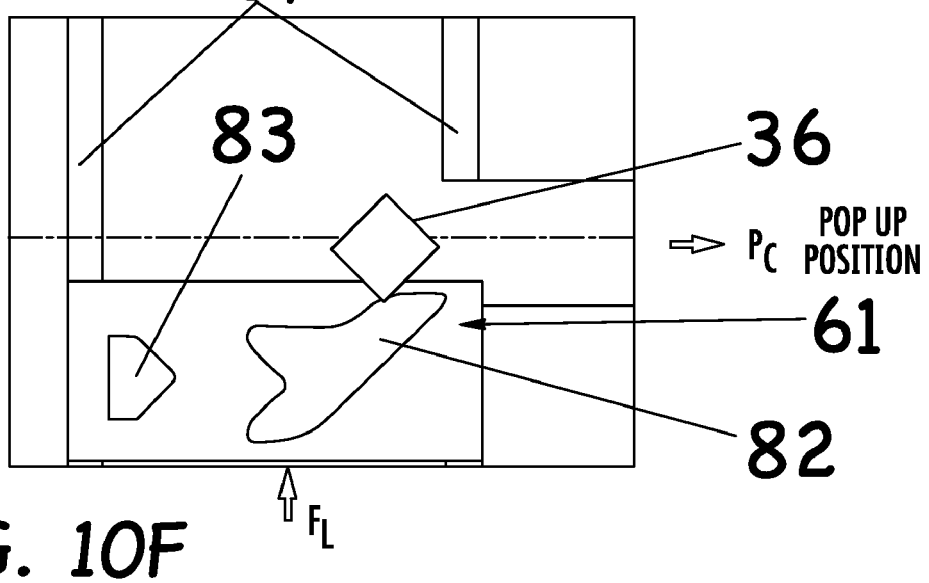

When a "second" inward pushing force signified by $P_{P2}$ is applied to connector 30, pin 36 moves inward, unseats from first cam 82, and moves slider 61 downward along top angled face of second cam 83 as shown in FIG. 10E. Finally pin 36 drives slider 61 further downward as shown in FIG. 10F. Pin 36 then moves along top surface of first cam 82 as shown in FIG. 10F, until it clears the right end of first cam 82. Slider 61 then moves upward due to left biasing force $F_L$ provided by leaf spring 62 on slider 61 and the outward spring force $P_C$ of connector 30 causes the connector 30 to pop out from adapter 50 as shown in FIG. 10A. Once pin 36 is freed in this manner, connector 30 can be withdrawn from adapter 50. All of the movements of slider 61 in FIGS. 10A to 10F in the push-push engagement/disengagement operation are in the same plane.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

We claim:

1. An optical fiber interconnect system comprising:
   A connector for carrying an optical fiber along a longitudinal axis;
   An adapter for operably connecting with the connector;
   Said adapter comprising a coupling mechanism for receiving and coupling with the connector upon application of a first pushing force to the connector so as to removably receive the connector in operably connected fashion;
   Said coupling mechanism including at least one slider operably connected to the adapter and moving in only a single plane and in planar translational fashion and without rotation with respect to the connector in response to application of a pushing force to the connector;
   said slider having a neutral position that is off-center with respect to the longitudinal axis of the connector; and,
   Said coupling mechanism uncoupling the connector from the adapter upon the application of only a second pushing force in the same direction and at the same location as the first pushing force, so as to cause said slider to move in translational fashion within a single plane and without rotation with respect to the adapter for withdrawal of the connector from the adapter.

2. A method of connecting and disconnecting an optical fiber connector and adapter comprising:
applying a first pushing force to the connector towards the adapter so that the adapter receives the connector;
moving a slider having a neutral position that is off-center with respect to the longitudinal axis of the connector and operably attached to the adapter in only translational fashion within a single plane and without rotation with respect to the connector, in response to the first pushing force, until the connector is engaged with the adapter in an operable arrangement;
applying only a second pushing force to the connector in the same direction and at the same location as the first pushing force so as to move a slider in response thereto, until the connector is disengaged from the adapter for withdrawal of the connector from the adapter.

3. An optical fiber interconnect system comprising:
A connector for carrying an optical fiber along a longitudinal axis;
An adapter for operably connecting with the connector;
Said adapter comprising a coupling mechanism for receiving and coupling with the connector upon application of a first pushing force to the connector so as to removably receive the connector in operably connected fashion;
Said coupling mechanism including at least one slider operably connected to the adapter and moving in only a planar translational fashion in response to application of a pushing force to the connector;
said slider having a neutral position that is off-center with respect to the longitudinal axis of the connector;
Said coupling mechanism uncoupling the connector from the adapter upon the application of only a second pushing force in the same direction and at the same location as the first pushing force, so as to cause said slider to move in translational fashion with respect to the adapter for withdrawal of the connector from the adapter;
Said connector comprising a modular contact having at least one angled latch proximate a first end thereof;
A connector housing having an open end leading to an interior configured for engaged receipt of said modular contact therein;
At least one opening in the connector housing for receipt of said angled latch when the modular contact is inserted therein so as to provide releasable retention of the modular contact within the connector housing; and
Said connector housing being further configured to provide access to the angled latch from a side of the connector assembly for disengagement of the modular contact from said first end of the connector assembly.

4. An optical fiber interconnect system comprising:
A connector for carrying at least one optical fiber;
An adapter having one end for receiving the connector and operably connecting it to another connector inserted at an opposite end;
A holder for operably mounting said adapter to a panel; and,
A locking mechanism operably associated with the holder and interposed between the connector and the adapter and comprising a stopper rotating from an engaged position to a disengaged position for preventing accidental disconnection of the connector from the adapter.

5. The system of claim 4 comprising said holder being configured to hold one end of the adapter substantially flat against the panel.

6. The system of claim 4 comprising said locking mechanism having two discrete positions, a first position for preventing accidental disconnection of the connector from the adapter; and, a second position for allowing disconnection of the connector from the adapter.

7. The system of claim 6 comprising said locking mechanism having only such two discrete positions and no intermediate position.

8. An optical fiber interconnect system comprising;
A connector carrying at least one optical fiber;
An adapter having one end for receiving the connector and operably connecting it to another connector inserted at an opposite end;
Said adapter including a push-push mechanism for receiving and retaining a connector at the first end thereof;
Said push-push mechanism having a slider that is moved in only a translational fashion within a single plane and without rotation with respect to the connector, in response to said connector;
Said slider having a neutral position that is off-center with respect to the longitudinal axis of the connector; and,
A single spring member operably connected to said adapter to provide a biasing force to the push-push mechanism.

9. An optical fiber interconnect system comprising:
A connector having an engagement pin and carrying at least one optical fiber;
An adapter having one end for receiving the connector and operably connecting it to another connector inserted at an opposite end;
A single spring member having first and second ends operably mounted to the adapter;
A slider member slidably mounted for only translational motion in a single plane and without rotation on said adapter;
The first end of the spring member being received within the slider member so as to spring bias the slider member and provide a neutral position that is off-center;
The second end of the spring member being retained within the adapter;
Said engagement pin engaging and retaining the slider when the connector is inserted in the adapter; and,
Wherein application of a single pushing force on said connector serves to connect said connector to said adapter and application of only a second pushing force to the connector in the same direction as the first pushing force serves to automatically disconnect the connector from the adapter.

* * * * *